United States Patent [19]

Gerdman

[11] 4,396,311
[45] Aug. 2, 1983

[54] CARRIER UNIT

[76] Inventor: Sven K. Gerdman, N:a Villavägen, Bjärred, Sweden, 230 50

[21] Appl. No.: 196,331

[22] Filed: Oct. 14, 1980

[30] Foreign Application Priority Data

Oct. 19, 1979 [SE] Sweden .................................. 7908681

[51] Int. Cl.³ .......................... F16B 7/08; F16B 9/00; F16L 41/00
[52] U.S. Cl. .................................... 403/187; 403/201; 52/481; 52/486; 52/715; 52/639; 52/762
[58] Field of Search .................. 403/187, 201; 52/281, 52/481, 486, 762, 715

[56] References Cited

U.S. PATENT DOCUMENTS

| | | | |
|---|---|---|---|
| 2,708,494 | 5/1955 | Larsen | 52/281 |
| 2,994,413 | 8/1961 | Levy et al. | 52/481 X |
| 3,195,735 | 7/1965 | Jay | 403/201 X |
| 3,332,190 | 7/1967 | Ekstrom | 52/281 X |
| 3,526,425 | 2/1970 | Kodaras | 403/201 X |

FOREIGN PATENT DOCUMENTS 773310  8/1934  France ................................ 403/201

Primary Examiner—Wayne L. Shedd
Attorney, Agent, or Firm—Schwartz, Jeffery, Schwaab, Mack, Blumenthal & Koch

[57] ABSTRACT

The present invention relates to a carrier unit, comprising at least one carrier frame (1) having mountably arranged devices (3 or 29) provided with hook portions (4) for cooperation with the carrier frame and mounting portions (6) for cooperation with at least one plate element (18).

In order to increase the carrying capacity without increasing the number and/or size of the members forming part of the carrier unit, as has been previously necessary, the invention is characterized in that the plate element (18) protrudes in between the mounting portions (6) of at least a pair of connecting devices (3 or 29) mounted on the carrier frame (1) and is secured to said mounting portions by means of at least one joint (22) extending through the mounting portions and the intermediate plate element.

10 Claims, 16 Drawing Figures

CARRIER UNIT

The present invention relates to a carrier unit, comprising at least one carrier frame having mountably arranged connecting devices provided with hook portions for cooperation with the carrier frame and mounting portions for cooperation with at least one plate element.

Carrier units having carrier frames with connecting devices for retainment of plate elements are generally known. However, carrier units of this type have often a poor carrying capacity, a problem which has not yet been eliminated otherwise than by providing the carrier unit with additional bars and/or increase the size of the members forming part of the carrier unit.

The object of the present invention is to eliminate said drawback and increase the carrying capacity without increasing the number and/or size of the members of the carrier unit. According to the invention this is accomplished by the features defined in the characterizing part of the following claims.

The invention will now be further described with reference to the enclosed drawings, in which FIG. 1 is a section through a carrier unit according to the invention;

Figure 1:
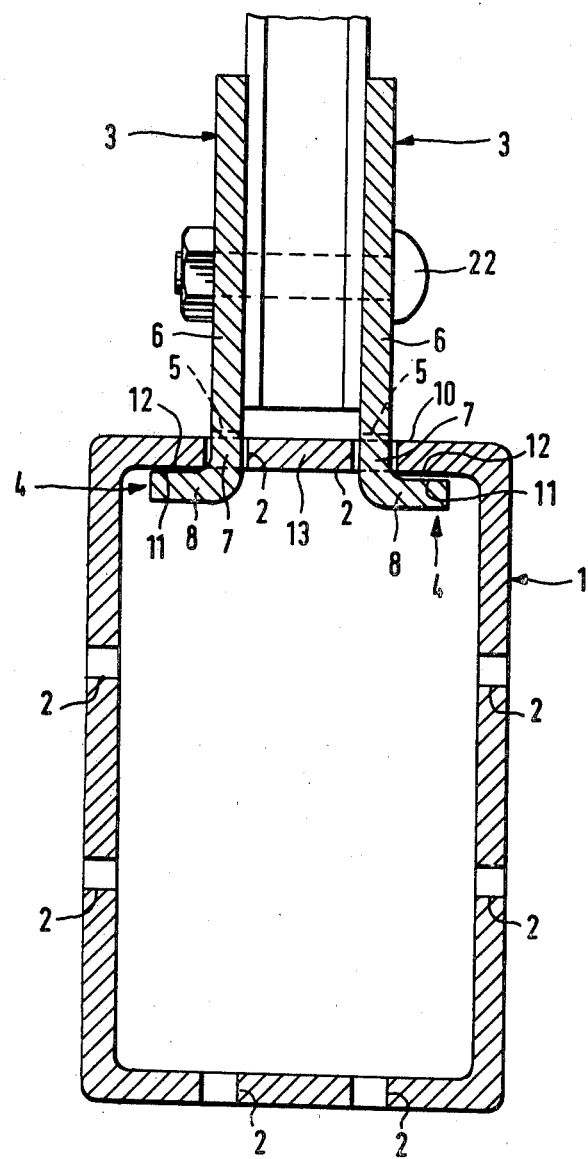
Figure 2:
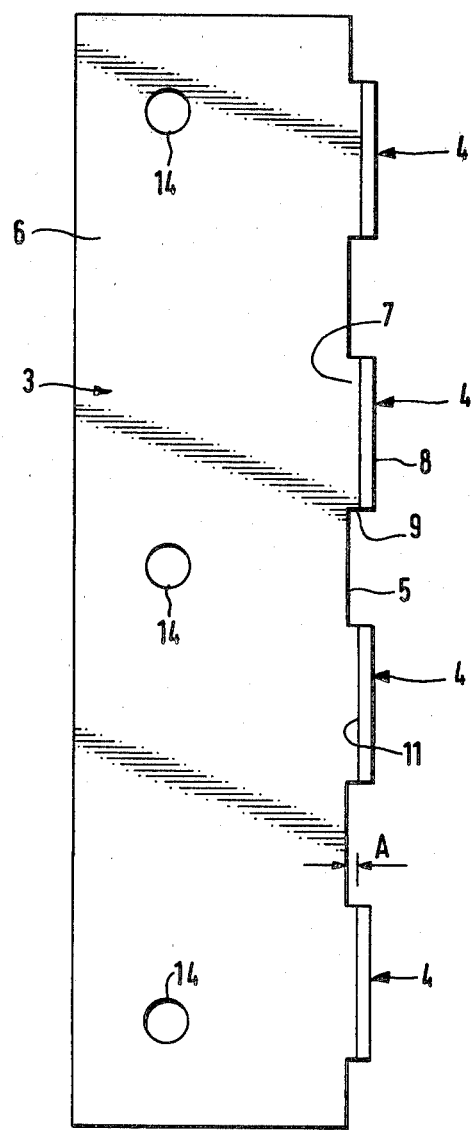
FIG. 2 is a plan view of a connecting device.
Figure 3:
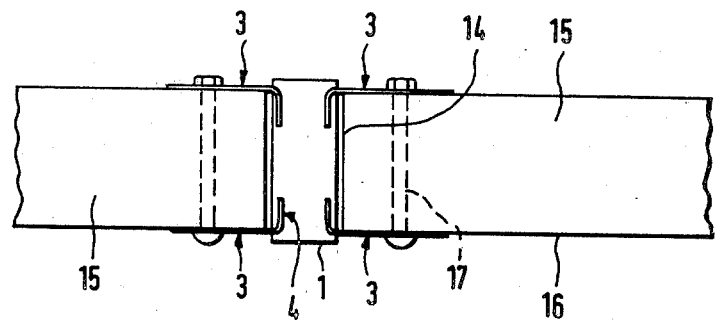
FIG. 3 shows a carrier profile with connecting device and roof or wall elements arranged thereon.
Figure 4:
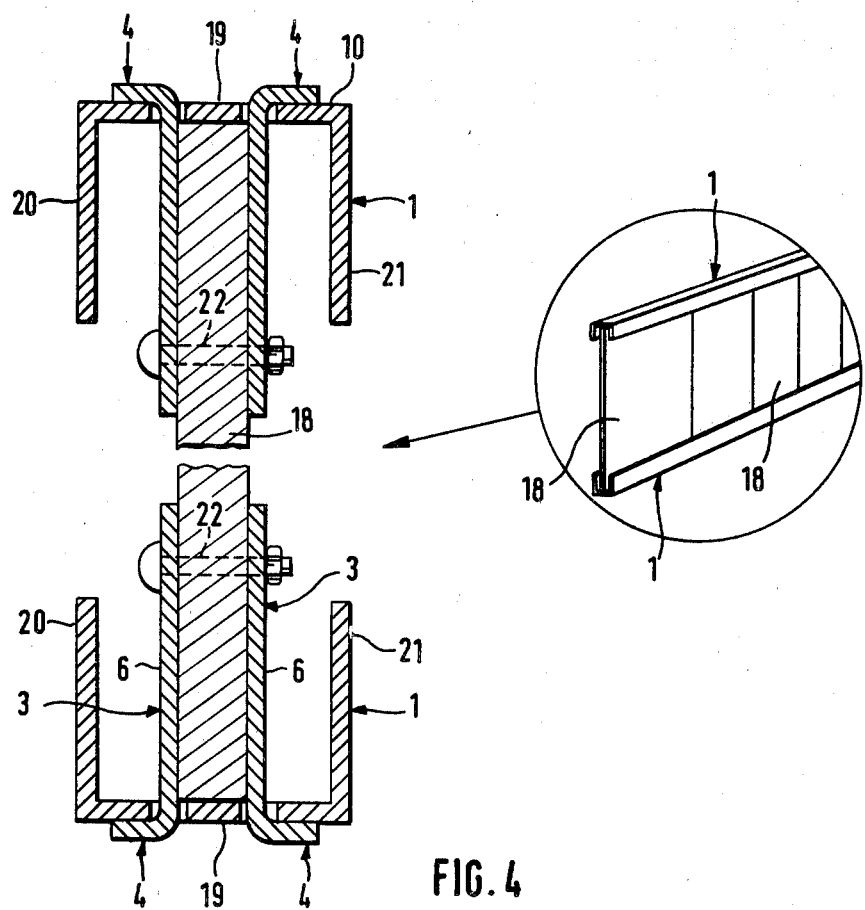
FIG. 4 shows carrier frames with connecting devices and a plate element arranged thereon to form a beam.
Figure 5:
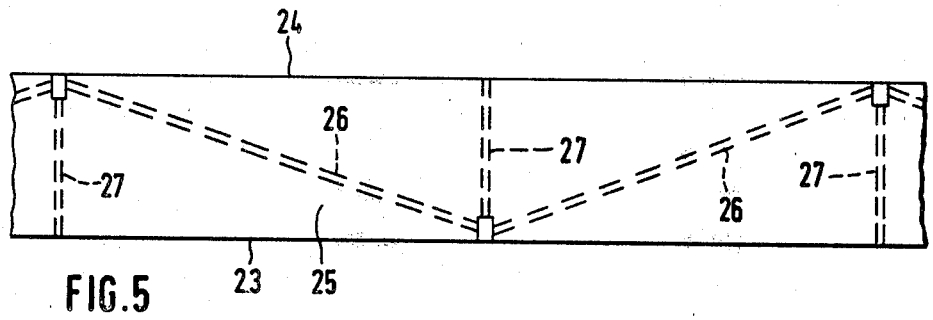
FIG. 5 shows carrier frames with connecting devices and diagonal bracings arranged thereon to form shelf constructions.
Figure 6:
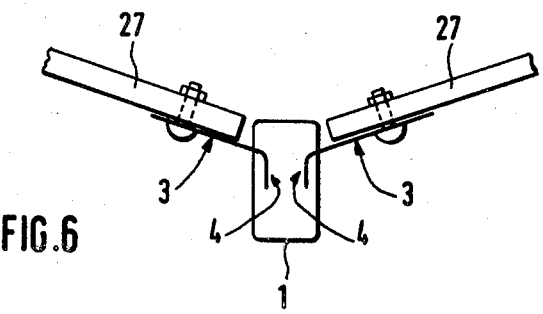
FIG. 6 is an enlarged view of a portion of FIG. 5.
Figure 7:
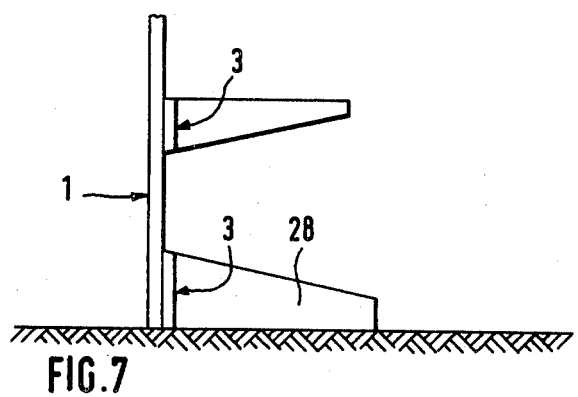
FIG. 7 shows a carrier frame with connecting devices and supports arranged thereon.
Figure 8:
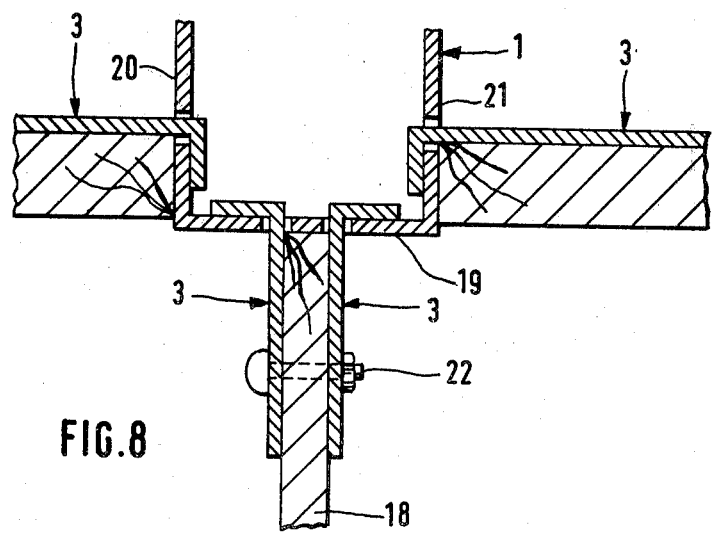
FIG. 8 shows a carrier frame with connecting devices to form e.g. walls or shelves.
Figure 9:
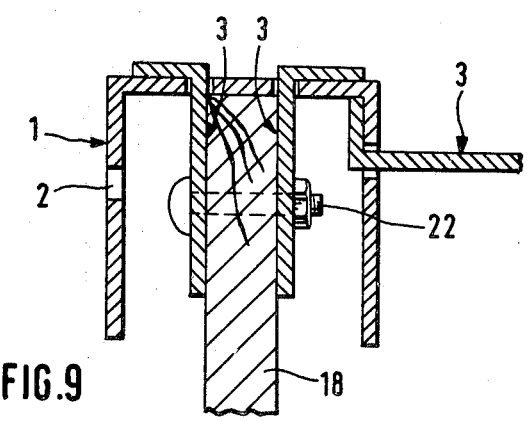
FIG. 9 shows a carrier frame with connecting devices also for forming e.g. walls or shelves.

The carrier construction shown in FIGS. 1 and 2 comprises a carrier frame 1 in the form of a square tube. This square tube has at least on one side thereof a line of recesses in the form of slots 2 for securing one or more connecting devices 3 functioning as retainers and having hook portions 4 adapted to be received in the slots 2 in the carrier frame 1. The hook portions 4 protrude form a side edge 5 of a main protion 6 of the mounting plate, said main portion 6 being substantially even and adapted for the mounting of various elements. Each hook portion 4 has two end portions 7 and 8 extending in different directions and of which the inner portion 7 is adapted to engage, with one edge 9 thereof, one of the edges of the recesses 2 when the hook portions are inserted into the recesses 2. After insertion of the hook portions into the recesses and rotation of the retainer 3 to coupling position, the edge 5 of the retainer 3 engages the outer surface 10 of the carrier frame 1 and one side 11 of the outer end portion 8 engages the inner surface 12 of the frame.

For obtaining an anchoring without play or almost without play of the retainer 3 at the carrier frame 1, the distance A between the edge 5 from which the hook portion 4 protrudes and the side 11 of the outer end portion 8 engaging the carrier frame 1 may be equal to or somewhat exceed the thickness of the portion 13 of the carrier frame 1 provided with the recesses.

The main portion 6 of the retainer 3 is substantially plane and provided with mounting holes 14 for securing various elements by means of different types of mounting means, e.g. bolts, whereby the assembly work at constructions comprising the carrier frame 1 and retainers 3 is facilitated. While the inner end portion 7 protrudes from the plate 6 extending in the same plane as the plate and the outer end portion 8 extends laterally relative to said plane, an especially simple and stable construction of the retainer 3 is obtained.

In order to plate elements such as roof or wall elements 15, the carrier frame 1 may be positioned adjacent an end edge of said plate element 15, whereby at least one retainer 3 with its hook portion 4 interfere in at least one recess 2 in the side 14 of the carrier frame 1 facing the roof or wall element 15 and whereby main portion 6 of the retainer 3 runs along one side 16 of the roof or wall element and is secured thereto by means of at least one mounting element 17 extending through the main portion 6. In order to provide a firm anchoring of the element at the carrier frame by retainer 3, the carrier frame has retainers arranged in pairs, between which the element extends and at which the element is secured e.g. by means of beams.

In order to provide a very strong element with a low weight the carrier construction may comprise at least one carrier frame 1 having at least a pair of retainers 3 at the main portions 6 of which is arranged a connecting element 18 extending between the main portions, whereby the opposite portion of the connecting element also extends between the main portions 6 of a carrier frame 1 having at least two retainers 3, at which the last mentioned connecting element portion is arranged. This element becomes especially stable while the carrier frame 1 is U-shaped, whereby the retainers are arranged at the web 19 thereof while the flanges 20, 21 extend in the same direction as the main portions 6 of the retainers 3. The element gets a low weight without reducing strength by providing the connecting element 18 as a plate e.g. of wood, preferably plywood, which plate is arranged at the retainers 3 by means of bolts 22 or similar extending through the plate and the main protions of the retainers.

For providing a simple and at the same time very stable carrier construction, carrier frames 1 are arranged alternately at opposite edges 23, 24 of a carrier construction, e.g. having shelves 25, whereby each carrier frame has at least one retainer 3 for diagonally extending supporting means 26 e.g. for the shelves. The carrier frames may also have retainers 3 on which supporting arms 27 e.g. for supporting the shelves 25 are provided. These supporting arms 27 preferably extend in a direction across the edges 23, 24 i.e. in a direction transverse to the long sides of the construction.

Except supporting arms 27, retainers 3 arranged in pairs may hook at least one support 28 and/or an end piece at the carrier frame 1.

Figure 10:
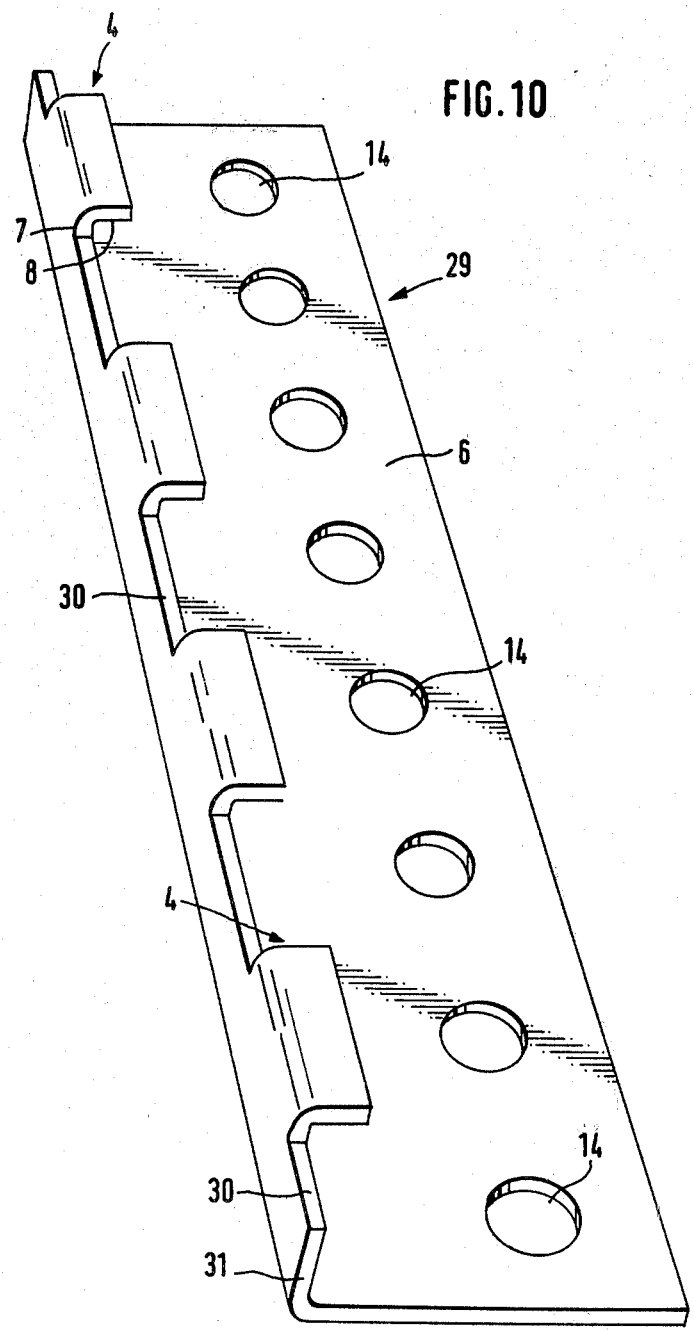
FIG. 10 illustrates an alternative embodiment of a connecting device with a perspective view.

FIG. 10 illustrates another connecting device 29 serving as a retainer. This retainer also has a mounting portion in the form of a plate 6 with holes 14 for a bolt 22 or another joint, but differs from the retainers shown in the previous figures while the hook portions 4 extend not from the edge 5 of the plate, but from an edge 30 of an edge portion 31 extending perpendicular or substantially perpendicular from the plate.

Figure 11:
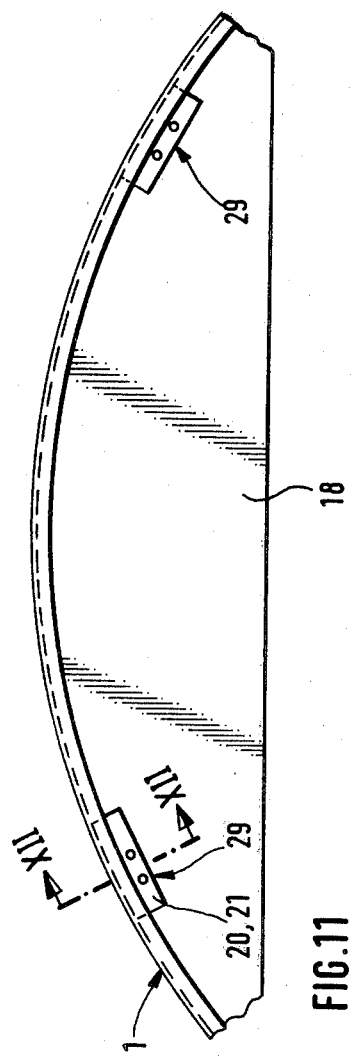
FIG. 11 illustrates a rafter construction.
Figure 12:
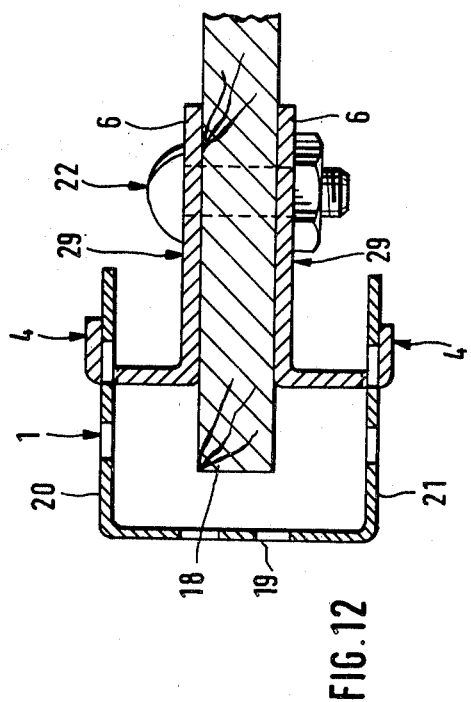
FIG. 12 is a section along the line XI—XI in FIG. 11.

FIGS. 11 and 12 show how retainers 29 are used at a roof construction. Thereby, a U-shaped carrier frame 1 is used which is bent to an arcuate beam, the flanges 20, 21 of which are directed downwards. The hook portions 4 of the retainers 29 are brought through holes 2 in the flanges 20, 21 of the frame and thereafter, the retainers are rotated such that inner surfaces of the hook portions 4 engage the outer surface of the flanges while the edges 30 of the retainers engage the inner surface of the flanges 20, 21 (see FIG. 12). A plate element 18, preferably a plywood or of a material with isolating and/or heat-resisting properties extends between the mounting portions 6 of the retainers and into the carrier frame itself and is mounted on the retainers 29 by means of one or more bolts 22. Preferably, a plurality of retainers are provided in pairs to connect the carrier frame 1 with the plate 18, said plate preferably follows the arcuate shape of the carrier frame and extends along the entire or major part of said frame. By this arrangement a carrier construction with a very high carrying capacity and which is easy to demount is obtained by means of a few simple and easily mountable members.

Figure 13:
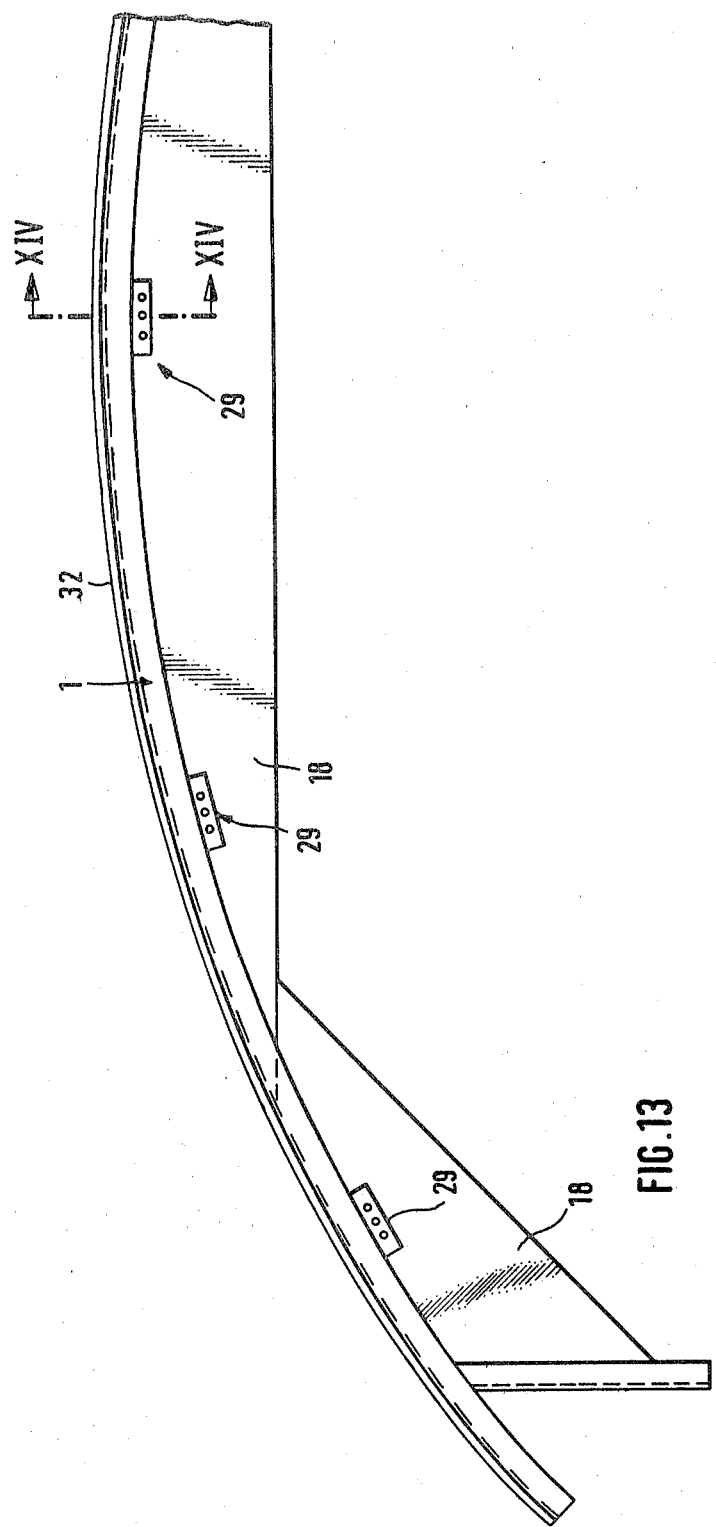
FIG. 13 illustrates a portion of another rafter construction.

Another roof construction is shown in FIG. 13. This construction also comprises an arcuate carrier frame 1 and plate elements 18 connected to the frame via retainers 29. Here, however retainers 29 extending in opposite directions are hooked onto the web 19 of the frame 1, whereby roof plate elements 32 protrude in between the mounting portions 6 of the retainers 29 and the web 19 of the carrier frame. The lower side of the plate elements 32 engage the web 19 the upper side thereof engage the mounting portion 6 and said elements are secured to the retainers 29 by means of one or more bolt connections 33. The plate elements 32 may be roof or ceiling plate elements, but may also have another shape than the shape as a plate and used for other purposes than to form the roof.

Figure 15:
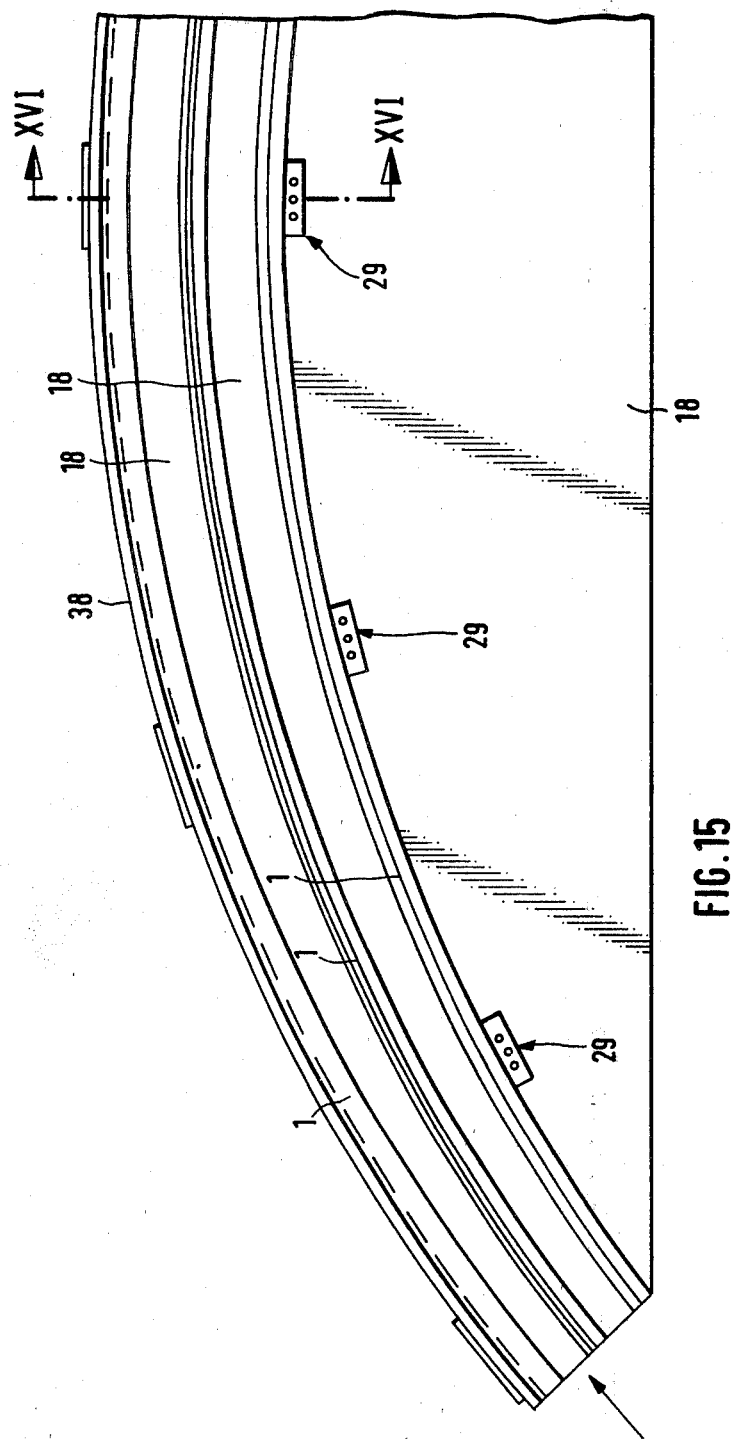
FIG. 15 shows a portion of a sunseeker construction.
Figure 16:
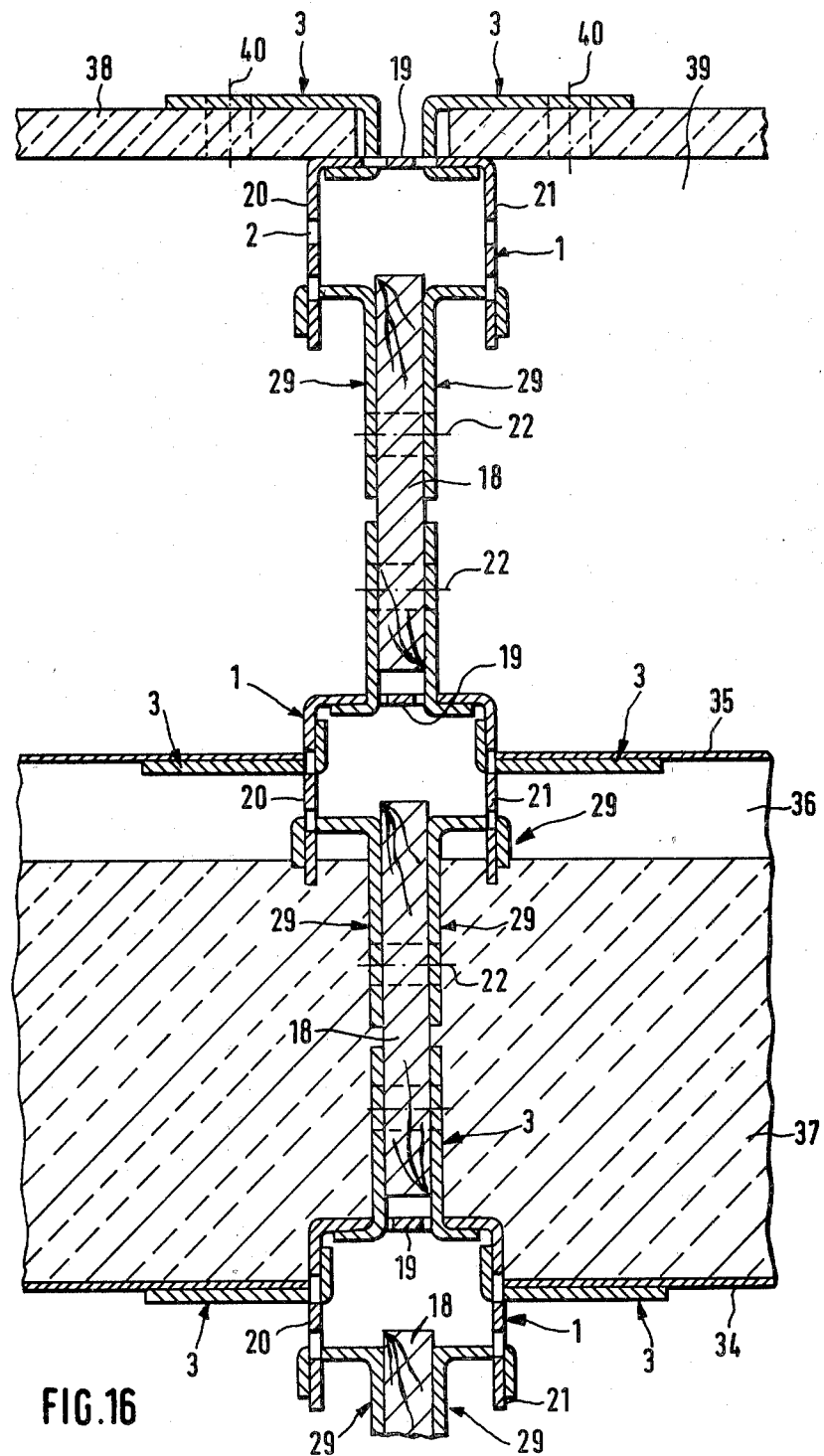
FIG. 16 is a section along the line XIV—XIV in FIG. 15.

FIG. 15 illustrates a portion of a sunseeker construction comprising three arcuate carrier frames 1, whereby a plate element 18 is connected to the lower carrier frame 1 via retainers 29, said plate element lying under the carrier frame and is adapted for bracing the construction. The lower carrier frame 1 is connected to the intermediate carrier frame 1 via at least one distance piece in the form of a plate element 18, which is connected to the lower carrier frame by means of retainers 3 and to the intermediate carrier frame via retainers 29. The intermediate carrier profile 1 is in turn connected to the upper carrier frame 1 via at least one distance piece in the form of a plate element 18 connected to the intermediate frame via retainers 3 and to the upper frame via retainers 29. Laterally protruding retainers 3 are hooked onto the flanges 20, 21 of the lower as well as the intermediate carrier frame and plate elements 34 and 35 are mounted (by screws or by other suitable mounting devices) on said retainers and define a space 36 for insulating material 37 which preferably is anchored to one or both plate elements 34, 35. The plate elements 34, 35 are preferably made of a heat resistant material and/or a material with neither a very little degree of permeability to solar radiation.

Roof elements 38 of heat and solar-radiation permeable material are mounted on the upper carrier frame via retainers 29 which are hooked onto the web 19 and protrude laterally in opposite directions, which means that the sun can heat the air beneath the roof elements 38 within the space 39 defined between the plate elements 35 and the roof elements 38, said space, like the space 36, preferably extends along the entire construction and communicates with a device (not shown) for collecting and utilizing the heated air.

Figure 14:
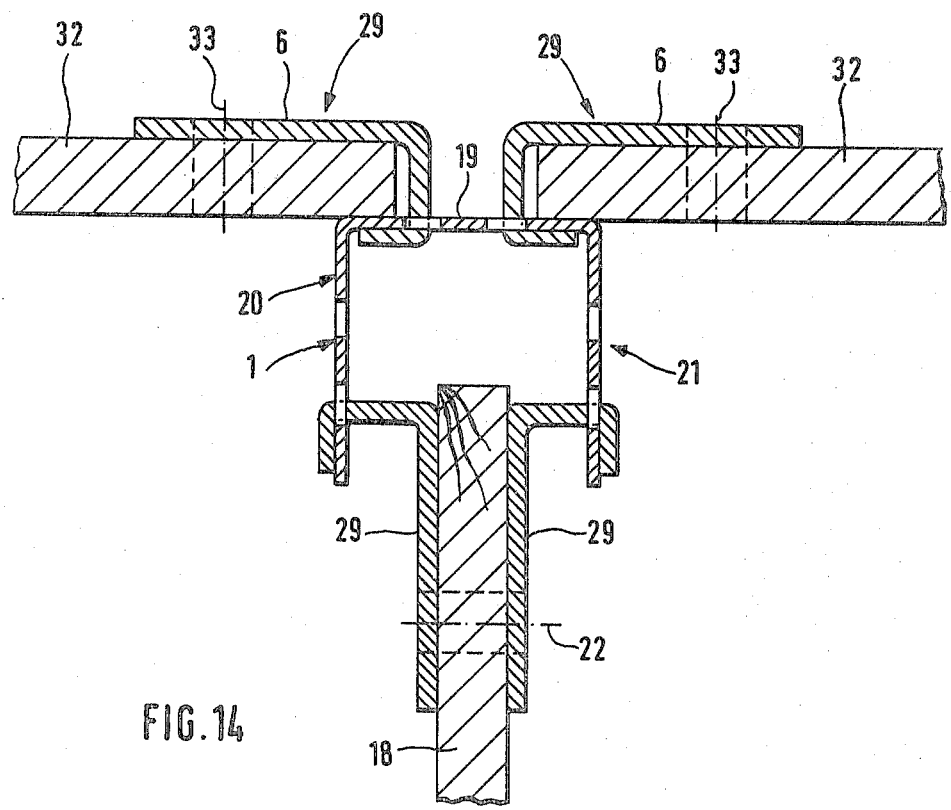
FIG. 14 is a section along the line XIV—XIV in FIG. 13.

The roof elements 38 are fixed by bolt connections 40 and arranged as the elements 32 in FIG. 14. Of course, it is not absolutely necessary to use bracing elements 18 in the form of plates beneath the lower carrier frame and therefore, these elements may be excluded while the plate elements 18 lie in the extension of each other, the construction becomes very rigid and may have a great width of span without increasing the size of the members forming part thereof to the same extent normally necessary to obtain sufficient stability.

An advantage is also that the members forming part of the construction give good space for connection of laterally directed retainers for anchoring various elements such as the plate elements 34, 35 and 38.

The various figures show that it is possible to use carrier frames of different shape and also plate elements of various shapes and materials and yet by simple means provide constructions with very high carrying capacities and of various types on the condition that the plate element protrudes in between the connecting devices and is secured thereto by means of through joints of any type.

Thus the invention is not limited to the constructions illustrated, but may vary within the scope of the following claims.

Finally, it may be noted that the distance between the mounting portions of the connecting devices is somewhat less than the thickness of the portion of the plate elements positionable between the mounting portion, such that a certain clamping effect is obtained when the mounting joint is screwed down.

The carrier frame may also be provided with one or more connecting devices, the mounting portion of which has one or more slots for at least one bolt or similar holding a fitting (not shown). The slots permit the fitting to be moved in a direction towards or away from the carrier frame and thereby enable clamping the plate element or another element against the carrier frame and thereby enable clamping the plate element or another element against the carrier frame directly or via a sealing strip on the carrier frame by means of the fitting.

What is claimed is:

1. A carrier unit, comprising:
   at least one carrier frame having hook receiving surfaces;
   connecting devices provided with mounting portions, and hook portions for cooperation with the carrier frame hook receiving surfaces;
   at least one plate element mounted between the mounting portions of at least a pair of said connecting devices, said plate element being mounted on the carrier frame and secured to said mounting portions by at least one joint connecting the mounting portions and the plate element.

2. A carrier unit according to claim 1, wherein at least one of said connecting devices is provided with an edge portion extending laterally from a mounting portion and from which a hook portion extends having an outer portion running substantially parallel to said mounting portion.

3. A carrier unit according to claim 1 or 2, wherein said plate element protrudes into the carrier frame.

4. A carrier unit according to claim 1, wherein said carrier frame has flanges and a web connecting said flanges, and said connecting devices comprise first connecting devices arranged at the flanges of the frame for mounting said at least one plate element protruding in one direction and, second connecting devices arranged at the web of the frame for mounting a second plate element protruding in the opposite direction and lying in an extension of the plane of said first plate element.

5. A carrier unit according to claim 4, wherein one of said plate elements protruding from the carrier frame forms a connecting element between carrier frames running beside each other.

6. A carrier unit according to claim 5, wherein at least one of said carrier frames is provided with laterally directed connecting devices for mounting laterally extending plate elements.

7. A carrier unit according to claim 1, wherein the distance between the mounting portions of said pair of said connecting devices is less than the thickness of said at least one plate element positioned between the mounting portions whereby said plate element is clamped between the connecting devices when said joint is tightened.

8. A carrier unit according to claim 1, wherein said carrier frame is arcuate and said at least one plate element extends along the frame for bracing thereof.

9. A carrier unit according to claim 1, wherein said carrier frame has two flanges and a web connecting said flanges, and said hook receiving surfaces are formed on each of said two flanges.

10. A carrier unit according to claim 1, wherein said plate element comprises insulating and/or heat resisting material, preferably wood material such as plywood.

* * * * *